(12) United States Patent
Muraki et al.

(10) Patent No.: US 6,461,050 B2
(45) Date of Patent: Oct. 8, 2002

(54) BALL BEARING DEVICE FOR A SWING ARM

(75) Inventors: Hiromitsu Muraki, Fujisawa; Katsuhiko Tanaka, Yamato; Shigeru Endo, Kanagawa-ken; Chuichi Sato, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/042,691

(22) Filed: Jan. 2, 2002

Prior Publication Data
US 2002/0097938 A1 Jul. 25, 2002

Related U.S. Application Data

(60) Continuation of application No. 09/532,944, filed on Mar. 22, 2000, now abandoned, which is a division of application No. 09/014,167, filed on Jan. 27, 1998, now Pat. No. 6,053,638.

(30) Foreign Application Priority Data

| Jan. 28, 1997 | (JP) | ............................................. | 9-013722 |
| Sep. 11, 1997 | (JP) | ............................................. | 9-246442 |
| Dec. 4, 1997 | (JP) | ............................................. | 9-334098 |

(51) Int. Cl.$^7$ .......................... F16C 33/58; F16C 27/04
(52) U.S. Cl. ..................... 384/513; 384/535; 384/581
(58) Field of Search .......................... 384/513, 537, 384/543, 535, 536, 569, 581; 360/265.2–265.7

(56) References Cited

U.S. PATENT DOCUMENTS

| 1,386,255 A | * | 8/1921 | Hindle et al. ................ 384/535 |
| 1,423,950 A | * | 7/1922 | Leon ........................... 384/535 |
| 1,965,293 A | * | 7/1934 | Ljungstrom .................. 384/535 |
| 3,513,480 A | * | 5/1970 | Robinson ..................... 384/535 |
| 3,549,220 A | * | 12/1970 | Robinson et al. ........... 384/535 |
| 4,898,481 A | * | 2/1990 | Hamblin ................. 384/535 X |
| 4,971,458 A | * | 11/1990 | Carlson .................. 384/581 X |
| 5,751,519 A | * | 5/1998 | Hata ....................... 360/265.6 |

FOREIGN PATENT DOCUMENTS

| JP | 4-360077 | * | 12/1992 |
| JP | 7-29327 | * | 1/1995 |
| JP | 7-282551 | * | 10/1995 |

* cited by examiner

Primary Examiner—Thomas R. Hannon
(74) Attorney, Agent, or Firm—Miles & Stockbridge P.C.

(57) ABSTRACT

The locus of the displacement of the centers of the balls of a ball bearing is made elliptical and the radial bearing rigidity of the ball bearing in one radial direction is made greater than the radial bearing rigidity in another radial direction orthogonal to the one radial direction, or at least one of the axial length of the portion on the inner diametral surface of the inner race of the ball bearing which is fitted to a shaft and the axial length of the portion on the outer diametral surface of the outer race of the ball bearing which is fitted to a housing is made ½ or less of the bearing width of the ball bearing, whereby the radial rigidity of a ball bearing device is made very small as compared with the radial rigidity in the prior art. As a result, the stability of a swing arm system can be enhanced and the higher speed and higher accuracy of control become possible.

13 Claims, 11 Drawing Sheets

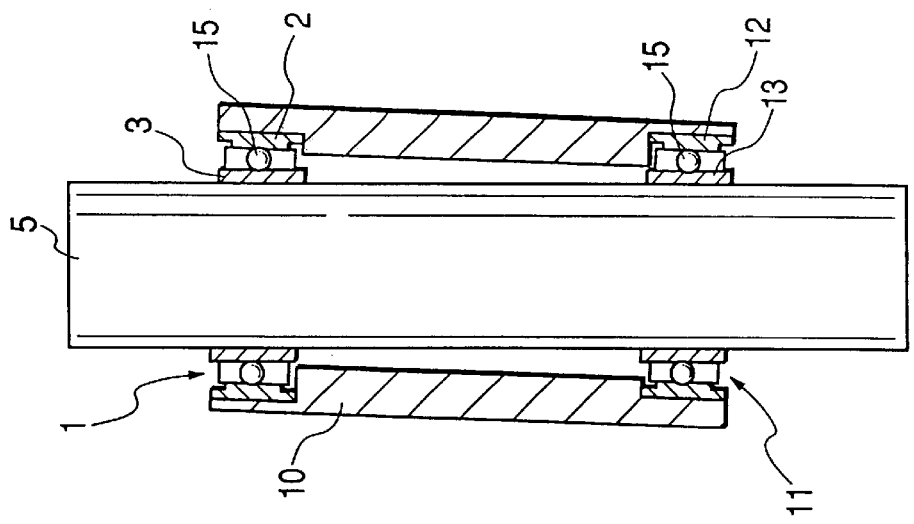
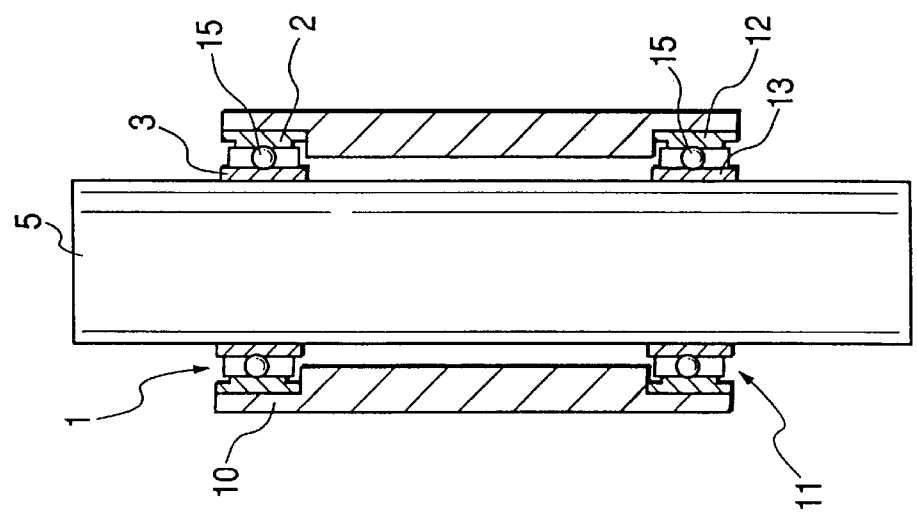
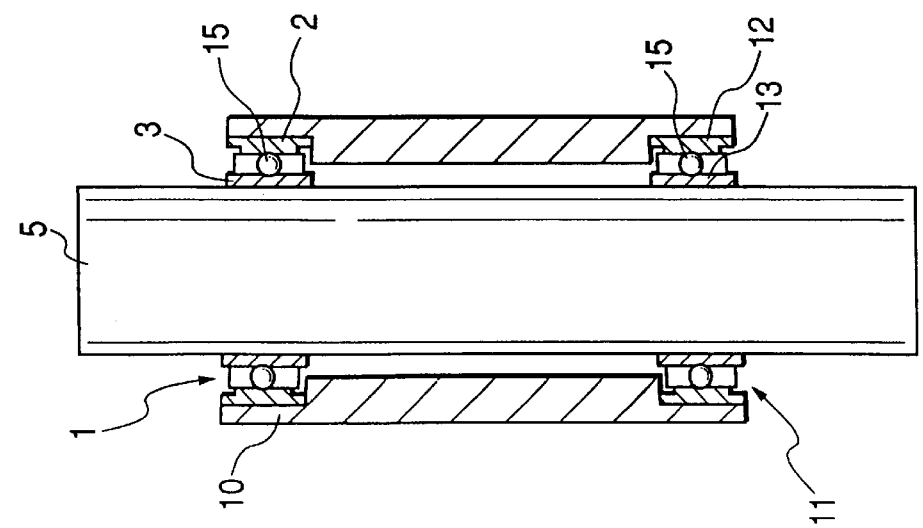

BALL BEARING DEVICE FOR A SWING ARM

CROSS-REFERENCE TO RELATED APPLICATIONS

This application is a continuation of application Ser. No. 09/532,944 filed Mar. 22, 2000 now abandoned, which is a division of application Ser. No. 09/014,167 filed Jan. 27, 1998 (now U.S. Pat. No. 6,053,638).

BACKGROUND OF THE INVENTION

1. Field of the Invention

This invention relates to a ball bearing device for the swing arm of a disc driving apparatus for a magnetic disc, an optical disc or the like.

2. Related Background Art

The bearing portion of a ball bearing device for a swing arm according to the prior art, as shown in FIG. 12A of the accompanying drawings, has ball bearings 1 and 11 having grease enclosed therein, and the ball bearings are used under a pre-load at predetermined positions. FIG. 12B of the accompanying drawings shows the surface pressure distribution 14 of the ball bearing 11 in a cross-section taken along the line 12B—12B of FIG. 12A, and the surface pressure distribution 14 is indicated by a circle, and the radial bearing rigidity of all portions in the circumferential direction thereof is constant.

As shown, there are fitting portions on both of the inner diametral surface of the inner race of the ball bearing fitted to a shaft 5 and the outer diametral surface of the outer race fitted to a housing 10.

These fitting portions are adhesively secured to the shaft 5 and the housing 10 over the entire bearing circumference of the ball bearings 1 and 11.

FIG. 12C of the accompanying drawings schematically shows the actually used state of the ball bearing device for a swing arm according to the prior art.

Recently, higher and higher density has been required of magnetic disc apparatuses. Therefore, the width of tracks for recording signals on the disc has become narrower and narrower, and higher speed of access to a target track and higher accuracy of positioning performance have been required of a swing arm carrying a head for recording and reproducing signals.

In order to satisfy the required higher speed and higher accuracy of control, freedom from a torque fluctuation such as a torque spike, a low torque, etc. is required of the ball bearings 1 and 11 supporting the swing arm 9. Also, high stability and low torque of the control of the swing arm system when controlled at a high speed are desired.

Heretofore, in the ball bearing device for the swing arm, as shown in FIG. 12A, the two ball bearings 1 and 11 have been accurately assembled together with a pre-load applied in the axial direction thereof to thereby achieve the higher accuracy of the bearing device. The present invention has as its object to provide a ball bearing device for a swing arm in which the stability of a swing arm system is enhanced and the higher speed and higher accuracy of control are possible.

SUMMARY OF THE INVENTION

In the present invention, in order to enhance the stability of the swing arm and the swing arm system and achieve higher speed and higher accuracy of control of the swing arm, attention has been paid to the rigidity of the ball bearing device in the radial direction thereof. It has been confirmed that it is effective to vary the rigidity in the radial direction in accordance with the following methods.

1) During the operation of the ball bearing device, the locus of the displacement of the centers of the balls is made elliptical, whereby the rigidity of the ball bearing device in the radial direction thereof is made to differ between two radial directions that are orthogonal to each other.

Particularly in the case of a straight swing arm, it is preferable that the rigidity in a first radial direction parallel to the axis of the arm be made great relative to the rigidity in a radial direction orthogonal to the first direction. Further it is preferable in enhancing the stability of the control of the swing arm to make the rigidity in the first direction greater by 5% or more.

2) The rigidity of the ball bearing device in the radial direction thereof is greatly reduced as compared with the rigidity of the ball bearing device of the prior-art construction in the radial direction thereof.

It is particularly preferable in enhancing the stability of the control of the swing arm that the rigidity in the radial direction be reduced to 50% or less relative to the rigidity of the ball bearing device of the prior-art construction in the radial direction thereof.

According to one aspect of the present invention, the ball bearing has a difference between the radial bearing rigidities in two directions orthogonal to each other.

In the present invention, the locus of the displacement of the centers of the balls of the ball bearing can be made elliptical, whereby the amount of elastic deformation of the balls and raceway surface is made to differ between the major axis side and the minor axis side of the ellipse. As a result, the contact surface pressure differs between the major axis direction and the minor axis direction of the ellipse and the radial bearing rigidity differs. Or further, if the radial bearing gap in a second radial direction is made larger than the radial bearing gap in a first radial direction orthogonal to the second radial direction, the balls and the raceway surface do not contact with each other in the second radial direction, and the radial bearing rigidity in that radial direction can be made small as compared with the radial bearing rigidity in the first radial direction. As a result, the radial bearing rigidities of the ball bearing in the two directions orthogonal to each other can be made to have a difference therebetween.

Specifically, in a ball bearing according to the present invention, it is preferable that balls be disposed between one raceway surface provided on an inner member and another raceway surface provided on an outer member and that at least one raceway surface be elliptical in its cross-section in a radial plane. Or further, it is preferable that the radial bearing gap in a first radial direction be smaller than the radial bearing gap orthogonal to the first radial direction. For example, in the ball bearing according to the present invention, the inner member may fit to a shaft and in the first radial direction, the inner member may be pressed into the shaft, and in the second radial direction, a gap may be provided between the inner member and the shaft. Or in a ball bearing according to the present invention, the outer member may fit to a housing and in the first radial direction, the outer member may be pressed into the housing, and in the second radial direction, a gap may be provided between the outer member and the housing.

Or further, in a ball bearing according to the present invention, the inner member may fit to the shaft and the outer member may fit to the housing, and a plane containing the centers of a plurality of balls disposed between one raceway surface of the inner member and the other raceway surface of the outer member may be inclined with respect to a plane perpendicular to the center axis of the rocking member of one of the shaft and the housing.

According to an aspect of the present invention, the ball bearing is characterized in that at least one of the axial length of the portion fitting to the shaft at the inner diametral surface of an inner race and the axial length of the portion fitting to the housing at the outer diametral surface of an outer race is ½ or less of the bearing width of the ball bearing. Thereby, the rigidity of the ball bearing device in the radial direction thereof is greatly reduced relative to the rigidity of the ball bearing device of the prior-art construction in the radial direction thereof.

According to another aspect of the present invention, the ball bearing device is characterized in that the radial bearing rigidities in two directions orthogonal to each other have a difference therebetween and at least one of the axial length of the portion fitted to the shaft at the inner diametral surface of the inner race and the axial length of the portion fitted to the housing at the outer diametral surface of the outer race is ½ or less of the bearing width of the ball bearing.

Other modes of the present invention will become apparent from the embodiments of the invention shown and described herein.

BRIEF DESCRIPTION OF THE DRAWINGS

FIGS. 3A, 3B and 3C are cross-sectional views showing a ball bearing device according to a third embodiment of the present invention.

DESCRIPTION OF THE PREFERRED EMBODIMENTS

Figure 1A:
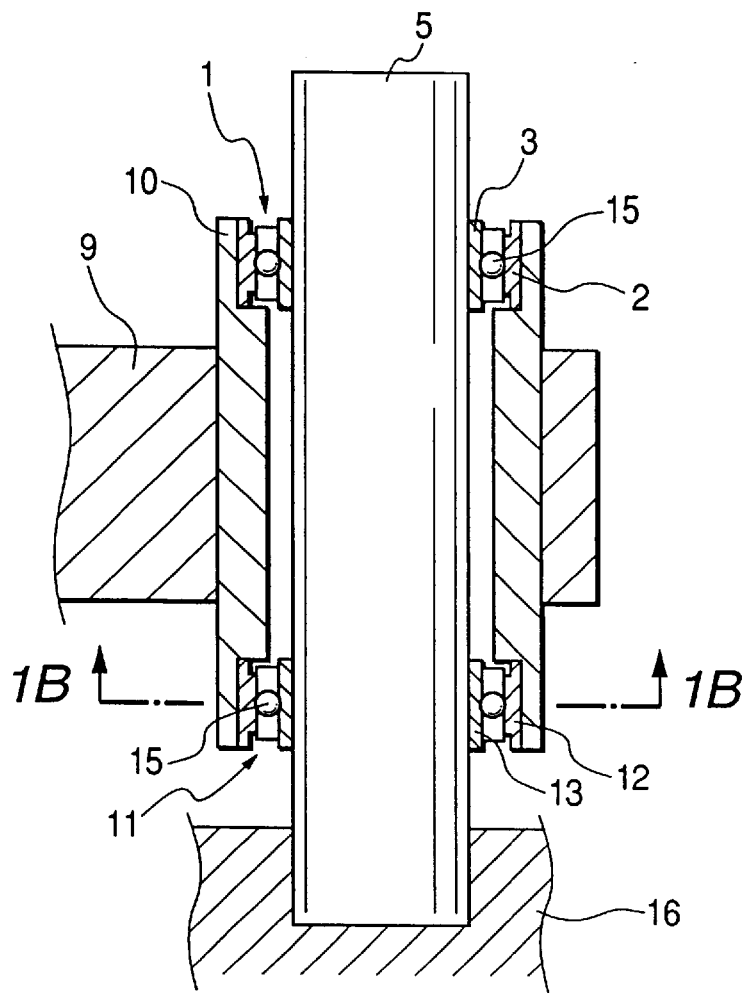
FIG. 1A is a cross-sectional view showing a ball bearing device according to a first embodiment of the present invention.

A first embodiment of the present invention will hereinafter be described with reference to the drawings. Like constituents in various embodiments are designated by like reference numerals.

Techniques for making the locus of the displacement of the center of a ball elliptical and making the rigidity of a ball bearing in the radial direction thereof differ between two radial directions orthogonal to each other include the following:

1. To work the raceway surface of at least one of an inner race and an outer race into an elliptical shape in advance.

2. During the incorporation of the ball bearing, to incline a plane containing the centers of a plurality of balls with respect to a plane perpendicular to the center axis of at least one of a shaft and a housing.

3. In a second radial direction, there is a gap between the ball bearing and the housing or the shaft, and in a first radial direction orthogonal to the second direction, deforming the raceway surface of one of the outer race and the inner race into an elliptical shape by the effect of the gap when the ball bearing is pressed into the housing or the shaft.

4. To apply additional working by which thermal deformation is created in the outer diametral surface or the inner diametral surface of the ball bearing, and deform the raceway surface of one of the outer race and the inner race.

Description will hereinafter be made in accordance with the drawings.

FIG. 1A shows a first embodiment using a ball bearing according to a first aspect of the present invention. In a deep groove ball bearing 1 (hereinafter referred to as the ball bearing), a plurality of balls 15 retained by a retainer are disposed between one raceway surface provided on the inner race 3, of an inner member (hereinafter referred to as the inner raceway surface) and the other raceway surface provided on the outer race 2, of an outer member (hereinafter referred to as the outer raceway surface). The inner raceway surface is such that its cross-section by a radial plane is circular, and the outer raceway surface is such that its cross-section in a radial plane is elliptical. As a result, the ball bearing 1 is such that the radial bearing gap in one radical direction is smaller than a radial bearing gap orthogonal to the one radial direction. A second bearing having an inner race 13 and an outer race 12 is similary constructed.

The ball bearings 1, 11 have their outer diametral surfaces fixedly fitted to the inner diametral surface of the cylindrical housing 10 of a magnetic disc apparatus at an axial interval and have their inner diametral surfaces fixedly fitted to a shaft 5 fixed to a base 16. The minor axis of the ellipse of the outer raceway surface provided on each of the outer races 2, 12 is incorporated so as to become parallel to the axial direction of a swing arm 9 fixedly fitted to the outer diametral surface of the housing 10. The shapes and direction of the minor axes of the ellipses of the raceway surfaces are made coincident with each other in the ball bearings 1 and 11. Thus, when the housing 10 is used as a rocking member, the axial direction of the swing arm 9 and the minor axis of the ellipse of each raceway surface will always be parallel to each other even through the swing arm 9 effects rocking movement.

When the raceway surfaces are worked into an elliptical shape in advance, the raceway surfaces can be made into an elliptical shape even if the ball bearings 1, 11 are used while being loosely fitted to the housing 10 and the shaft 5.

Figure 1B:
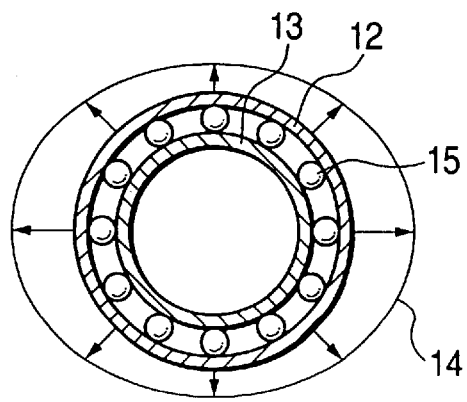
FIG. 1B shows the surface pressure distribution of the portion of contact between a raceway surface and balls in the first embodiment of the present invention.

FIG. 1B shows a cross-section taken along the line 1B—1B of FIG. 1A and the surface pressure distribution 14 of the portion of contact between the balls 15 and raceway surface of the ball bearing 11. The dimensions of the major axis and the minor axis are set such that the surface pressure of each ellipse of the raceway surfaces of the outer races in the direction of the minor axis thereof is about twice as great as the surface pressure in the direction of the major axis. As described above, the structure according to the first embodiment of the present invention is such that the locus of the displacement of the centers of the balls 15 is elliptical, and as a result, the radial bearing rigidity in one radial direction, i.e., the direction of the minor axis, is greater than the radial bearing rigidity in the other radial direction orthogonal to the one radial direction, i.e., the direction of the major axis.

Figure 2:
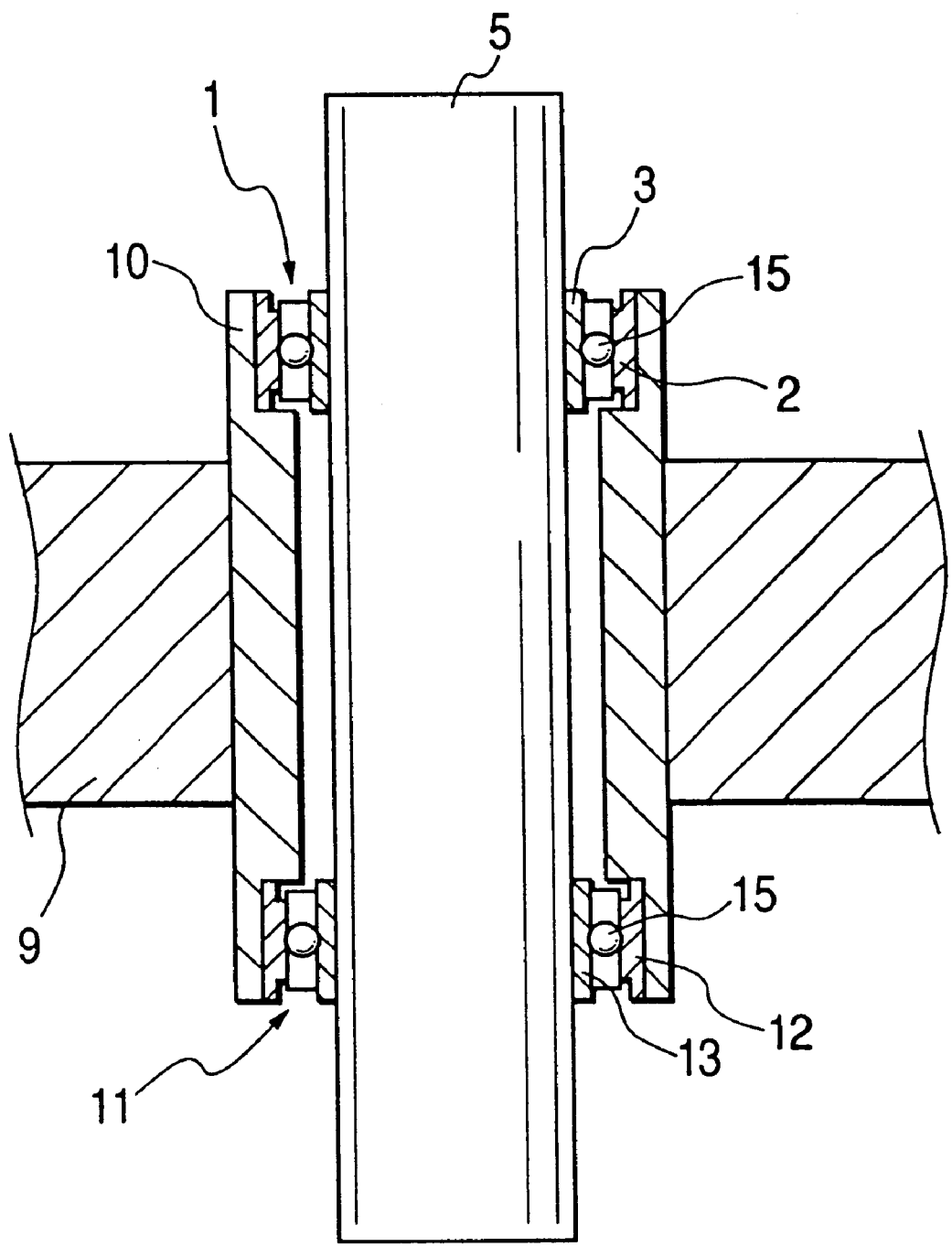
FIG. 2 is a cross-sectional view showing a ball bearing device according to a second embodiment of the present invention.

FIG. 2 shows a second embodiment of the present invention in which the shaft 5 is a rocking member. For the ball bearings 1, 11, the raceway surface of each of the inner members, i.e., the inner races 3, 13, is worked in advance so that its cross-section in a radial plane becomes elliptical and the raceway surface of the each of the outer races 2, 12 is worked in advance so that its cross-section in a radial plane becomes circular. The bearings 1, 11 are incorporated in the housing 10 fixed to the base 16 of the magnetic disc apparatus, in a direction in which the major axis of each of the ellipses of the raceway surfaces of the inner races 3, 13 is parallel to the axial direction of the swing arm 9 fixed to the shaft 5. The shapes and directions of the major axes of the ellipses of the raceway surfaces are made coincident with each other between the two upper and lower ball bearings 1 and 11. As a result, the ball bearings are such that the radial bearing gap in one radial direction is smaller than the radial bearing gap orthogonal to the one radial direction.

When the raceway surfaces are thus worked into an elliptical shape in advance, the raceway surfaces can be made elliptical even if the ball bearings 1, 11 are used while being loosely fitted to the housing 10 and the shaft 5. As described above, the ball bearing according to the second embodiment of the present invention is such that the locus of the displacement of the centers of the balls 15 is elliptical and as a result, the radial bearing rigidity in one radial direction is greater than the radial bearing rigidity in the other radial direction orthogonal to the one radial direction.

FIGS. 3A to 3C show a third embodiment of the present invention. The swing arm in this embodiment is such that the ball bearings 1, 11 in which the raceway surface of each of the inner races 3, 13 and the raceway surface of each of the outer races 2, 12 are worked into an ordinary standard. Each bearing is assembled to the shaft 5 and the housing 10 in a state in which a plane containing the centers of a plurality of balls 15 is inclined with respect to a plane perpendicular to the center axis of the rocking member of one of the shaft 5 and the housing 10, whereby the locus of the displacement of the centers of the balls 15 is made elliptical. As in the ordinary standard ball bearing, one raceway surface and the other raceway surface are circular in their cross-section by a radial plane. In the present embodiment, however, by the standard ball bearings 1, 11 being inclined and mounted, the balls 15 are displaced in the axial bearing gaps of the ball bearings 1, 11 in the axial direction of the ball bearings 1, 11, whereby the locus of the displacement of the centers of the balls 15 is made elliptical. The inner diametral surfaces of the inner races 3, 13 are parallel to the center axis of the shaft 5, and the outer diametral surfaces of the outer races 2, 12 are perpendicular to a plane containing the centers of the plurality of balls 15.

FIG. 3A shows a case where the upper and lower ball bearings 1 and 11 have been symmetrically inclined and mounted and thereafter a constant position pre-load has been applied thereto. The center axis of the shaft 5 is concentric with the center axis of the housing 10.

FIG. 3B shows a case where the upper and lower ball bearings 1 and 11 have been inclined in the same direction and mounted and thereafter a pre-load has been applied thereto. The center axis of the shaft 5 is concentric with the center axis of the housing 10.

FIG. 3C shows a case where the upper and lower ball bearings 1 and 11 have been inclined in the same direction and mounted and thereafter a constant position pre-load has been applied thereto. The center axis of the shaft 5 is inclined with respect to the center axis of the housing 10.

In any of the above-described three examples, the plane containing the centers of the plurality of balls becomes inclined with respect to the plane perpendicular to the center axis of the rocking member of one of the shaft 5 and the housing 10, and as a result, the track locus becomes elliptical. As described above, in the present embodiment, the radial bearing rigidity of the ball bearings in one radial direction becomes greater than the radial bearing rigidity in the other radial direction orthogonal to the one radial direction, and the radial bearing gap in the one radial direction becomes smaller than the radial bearing gap in the other radial direction orthogonal to the one radial direction. As a result, again in the present embodiment, there is obtained an effect similar to that of the first embodiment.

In the case of this third embodiment, at least one of the ordinary ball bearings 1, 11, the shaft 5 and the housing 10 can be slightly worked and used and therefore, the cost is low.

Figure 4A:
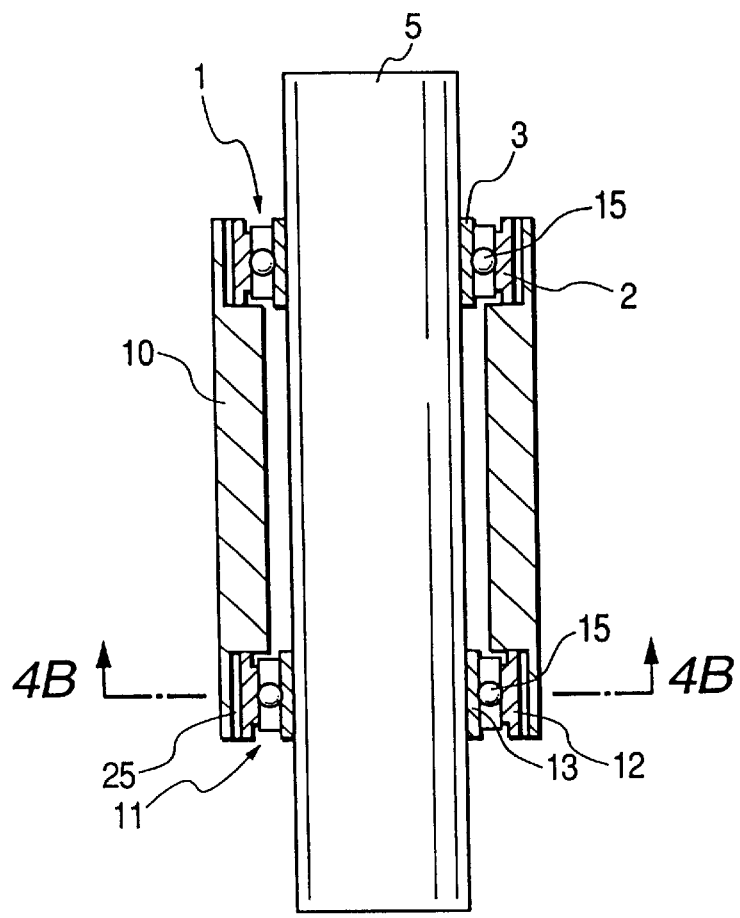
FIG. 4A is a cross-sectional view showing a ball bearing device according to a fourth embodiment of the present invention.
Figure 4B:
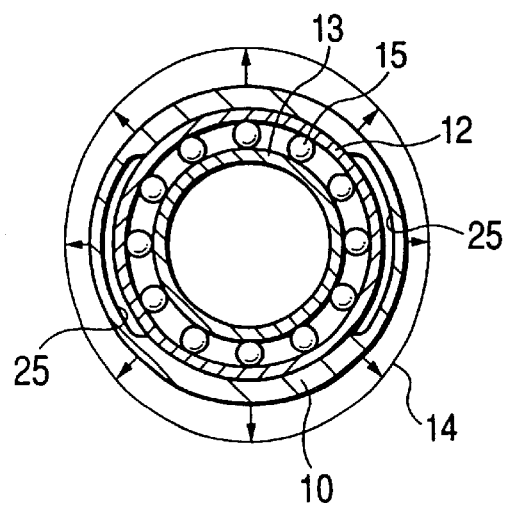
FIG. 4B shows the surface pressure distribution of the portion of contact between a raceway surface and balls in the fourth embodiment of the present invention.

FIGS. 4A and 4B show a fourth embodiment of the present invention. FIG. 4B shows a cross-section taken along the line 4B—4B of FIG. 4A and the surface pressure distribution in the cross-section, and in this embodiment, two ordinary ball bearings are pressed into the housing 10 to thereby make the outer diametral surfaces and raceway surfaces of the outer races elliptical. On the inner diametral surface of the housing 10, escapes 25 are formed in advance on the opposite sides of the center axis of the ball bearings 1, 11 in one radial direction. When this is done, the portion of the escapes 25 in the ball bearings 1, 11 becomes loosely fitted and the pressed-in portion in the other radial direction orthogonal to one radial direction linking the escapes 25 together becomes tightly fitted, whereby a compression load acts on the outer races 2, 12 of the ball bearings 1, 11 in the pressed-in portion. As a result, the outer diametral surfaces and raceway surfaces of the outer races 2, 12 are deformed into an elliptical shape in which the cross-section in the radial plane has the portion of the escapes 25 on the major axis. If these escapes 25 are provided in a direction orthogonal to the axial direction of the swing arm 9 mounted on the shaft 5, the radial bearing rigidity in a direction parallel to the axial direction of the swing arm can be made greater than in a direction orthogonal to the axial direction of the swing arm 9. The raceway surface of one of the inner races 3, 13 is circular in its cross-section in the radial plane. The effect is substantially similar to that of the aforedescribed embodiments. This embodiment enables ordinary ball bearings to be used and therefore is low in cost. Also, the housing 10 is simply provided with the escapes 25 and therefore, the factors for an increased cost are few in the working of the housing as well.

Figure 5A:
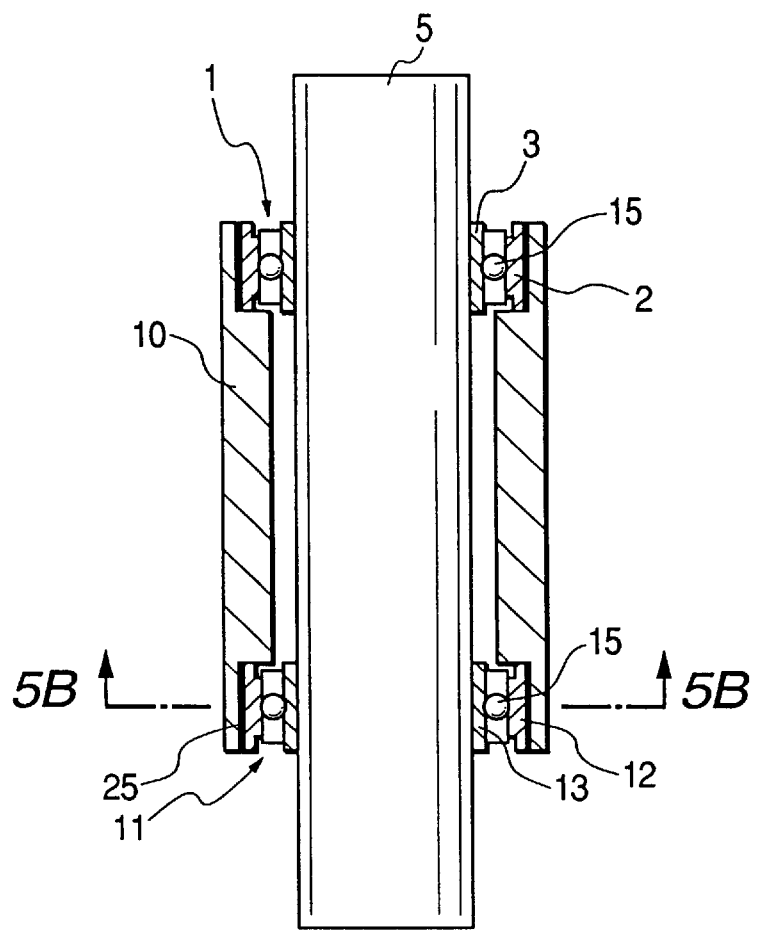
FIG. 5A is a cross-sectional view showing a ball bearing device according to a fifth embodiment of the present invention.
Figure 5B:
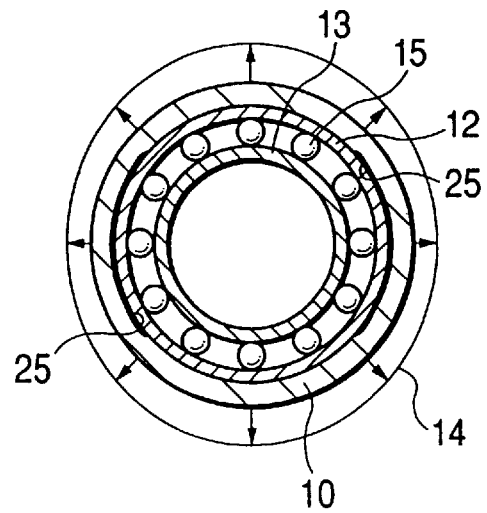
FIG. 5B shows the surface pressure distribution of the portion of contact between a raceway surface and balls in the fifth embodiment of the present invention.

FIGS. 5A and 5B show a fifth embodiment of the present invention. FIG. 5B shows a cross-section taken along the line 5B—5B of FIG. 5A and a surface pressure distribution in the cross-section, and in this embodiment, as in the fourth embodiment, the ball bearings 1, 11 are pressed into the housing 10 to thereby make the raceway surfaces of the outer races 2, 12 elliptical. The difference of the present embodiment from the fourth embodiment is that the escapes 25 are provided not on the housing 10 but on the outer diametral surfaces of the outer races 2, 12.

Figure 6A:
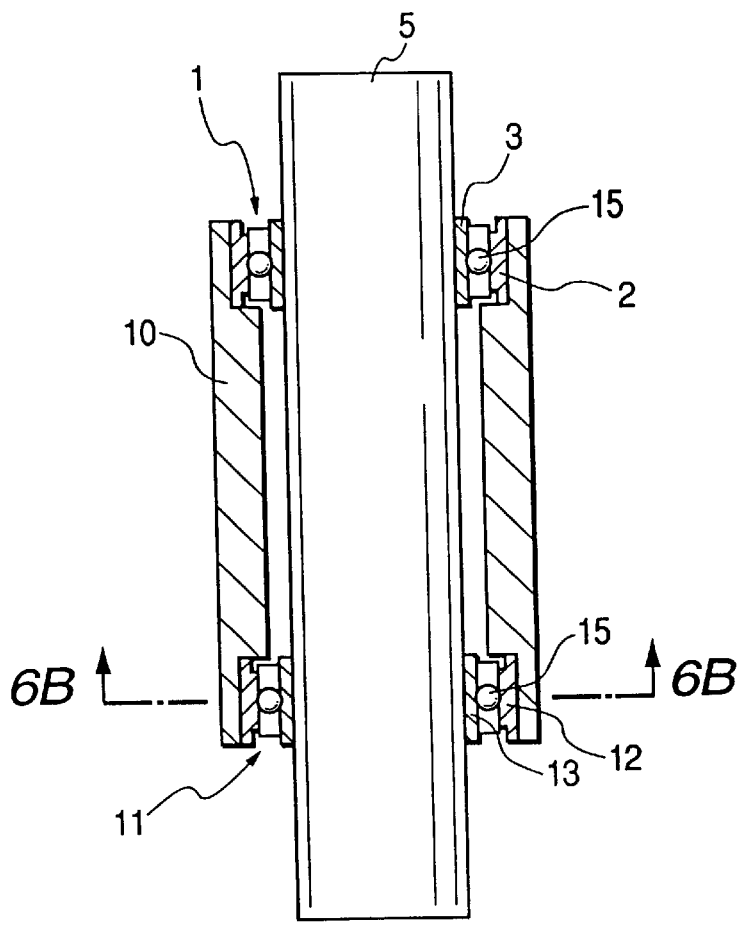
FIG. 6A is a cross-sectional view showing a ball bearing device according to a sixth embodiment of the present invention.
Figure 6B:
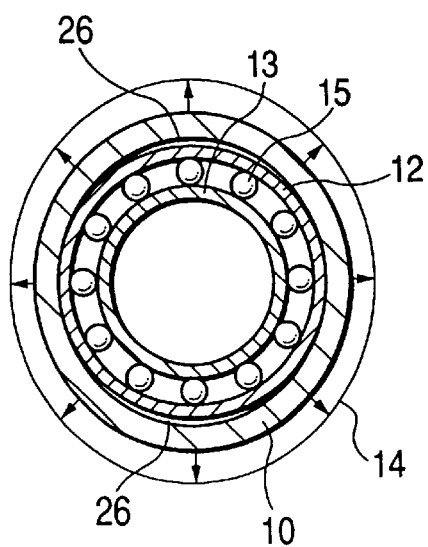
FIG. 6B shows the surface pressure distribution of the portion of contact between a raceway surface and balls in the sixth embodiment of the present invention.

FIGS. 6A and 6B show a sixth embodiment of the present invention. FIG. 6B shows a cross-section taken along the line 6B—6B of FIG. 6A and a surface pressure distribution in the cross-section, and in this embodiment, an energy beam such as a laser beam is locally applied to the outer races 2, 12 of ordinary ball bearings 1, 11 to thereby cause thermal deformation, thus deforming (thermally deformed portions 26) the outer diametral surfaces and the other raceway surface of the outer races 2, 12 so that the cross-section by a radial plane may become elliptical. In the present embodiment, the laser is applied to two portions of the outer diametral surface of the outer races 2, 12 which are spaced apart by 180° from each other to thereby deform the outer diametral surfaces and raceway surfaces of the outer races 2, 12 into an ellipse, whereafter the ball bearings 1, 11 are mounted on the housing 10 as by loose fitting. One raceway surface of the inner races 3, 13 is circular in its cross-section by a radial plane. In the other points, the effect of the present embodiment is substantially similar to that of the embodiments hitherto described.

Both of one raceway surface and the other raceway surface may be elliptical in their cross-sections in a radial plane, and the major axis of the ellipse of one raceway surface and the major axis of the ellipse of the other raceway surface may be orthogonal to each other.

Also, even if in one radial direction, the inner member is pressed into the shaft 5 and in the other radial direction orthogonal to the one radial direction, there is a gap between the inner member and the shaft 5, one raceway surface of the inner races 3, 13 of the inner member becomes elliptical in its cross-section in a radial plane. In this case, the other raceway surface of the outer member may be circular or elliptical in its cross-section in a radial plane.

As regards the ball bearings 1, 11, if the radial bearing rigidity in one radial direction is greater than the radial bearing rigidity in the other radial direction orthogonal to the one radial direction, the radial bearing gap becomes larger in the other radial direction than in the one radial direction and a low torque is provided. Accordingly, there can be provided a ball bearing in which the radial bearing rigidity in the necessary radial direction is made great and which is of a low torque as a whole.

Also, embodiments in which the raceway surfaces of the ball bearings are elliptical other than the above-described embodiments will do, and an embodiment in which the locus of the displacement of the centers of the balls is elliptical will also do, and any of these embodiments can provide an effect similar to that of the present invention.

As regards the ball bearings 1, 11, with the inner member as a shaft, one raceway surface may be provided on the shaft, and with the outer member as a housing, the other raceway surface may be provided on the housing.

A second aspect of the present invention will now be described.

Figure 7A:
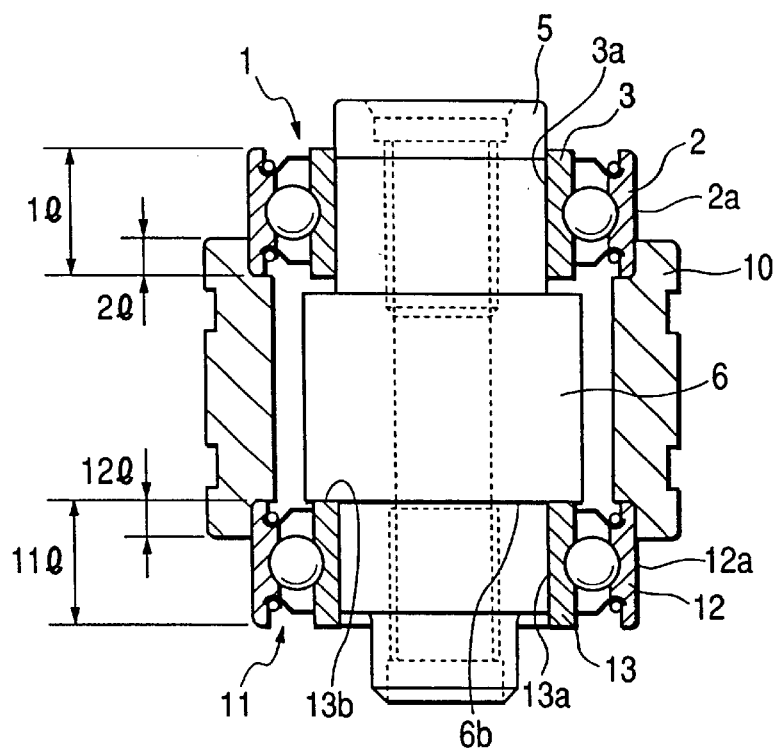
FIG. 7A is a schematic cross-sectional view of a ball bearing device according to a seventh embodiment of the present invention.

FIG. 7A shows a seventh embodiment of a ball bearing device, which is constructed according to a second aspect of the present invention. The ball bearings 1, 11 have a plurality of balls retained by a retainer between outer races 2, 12 and inner races 3, 13.

These ball bearings 1, 11 are incorporated in the axially opposite end portions of the inner diametral surface of a housing 10 on which the swing arm 9 of a magnetic disc apparatus is mounted. The upper and lower ball bearings 1 and 11 are fixed to the housing 10 by light press-in fit on the outer diametral surfaces 2a and 12a of the respective outer races 2 and 12. Both of the two outer races 2, 12 have their axially inner sides in contact with a stepped surface perpendicular to the axis of the housing 10.

The ball bearings 1, 11 have the axial lengths 2l and 12l of their portions fitted to the housing 10 on the outer diametral surfaces 2a and 12a of the outer races 2 and 12 set to ½ or less of the bearing widths 1l and 11l of the ball bearings 1 and 11. The inner race 13 of the lower ball bearing 11 has a shaft 5 fixed to its inner diametral surface by light press-in. The portions of the two ball bearings 1, 11 which are fitted to the housing 10 on the outer diametral surfaces 2a and 12a of the outer races are axially inner portions, i.e., portions inside the housing 10.

Also, as regards the shaft 5, a flange portion 6 provided at the axially central portion is larger in diameter than the axially opposite portions adjacent to the flange portion 6 and further, for the ease of assembly and the enlargement of a pair of bearing spans, the inner race 13 of the lower ball bearing has its axially inner side in contact with the stepped surface of the flange portion 6. The inner diametral surface 3a of the inner race 3 of the upper ball bearing 1 is fixed to the shaft 5 by light press-in while pre-load setting by a resonance frequency is effected. Furthermore, for the prevention of the slippage by a shock load, an adhesive agent is applied to the upper side 13b of the inner race 13 of the lower ball bearing, which is thus fixed to the shaft 5.

For the reduction of the radial rigidity and the ease of washing, the shaft 5 is a hollow shaft having a hole axially extending through the central portion of the shaft 5 and further, threaded grooves are formed from the upper and lower opening end portions of the hole so that mounting screws can be mounted in the shaft 5. The material of the shaft may be stainless steel, but it is preferable to use a material having a small modulus of longitudinal elasticity such as aluminum in order to reduce the radial rigidity.

Figure 8:
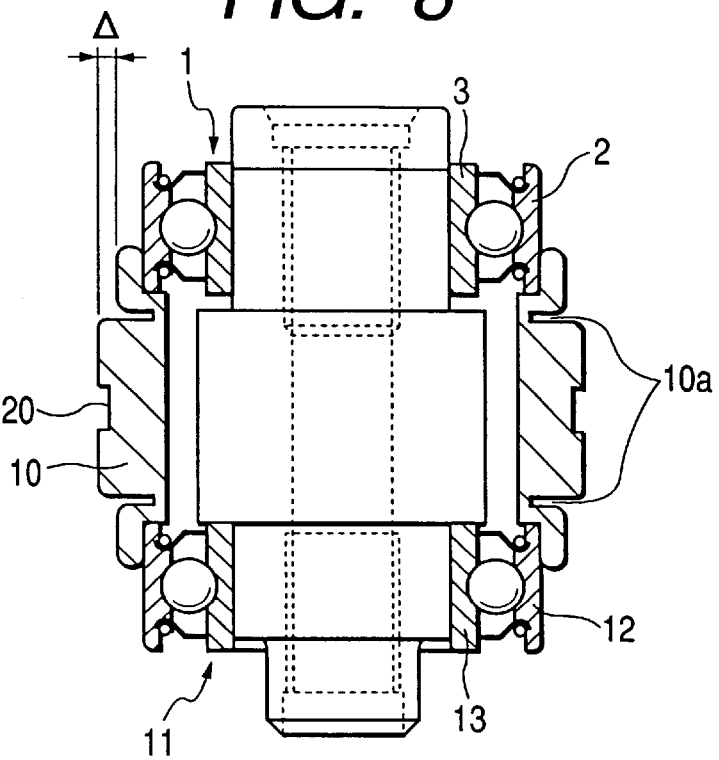
FIG. 8 is a schematic longitudinal cross-sectional view of a ball bearing device according to an eighth embodiment of the present invention in which the rigidity of a housing is reduced.

Further, as in an eighth embodiment shown in FIG. 8, slits 10a can be formed in the outer diametral surface of the housing 10 in the portions between the two ball bearings 1 and 11 which are near the two ball bearings to thereby reduce the radial rigidity of the housing 10. In this case, the housing 10 has the outer diameter of its portions located on the ball bearing 1, 11 sides axially outward of those portions formed with the slits 10a made smaller than the outer diameter of the portion between the upper and lower slits 10a at the center of the housing 10 and a level difference Δ is provided on the housing 10.

Accordingly, the housing 10 is elastically deformable without its portions axially outward of the slits 10a contacting with a swing arm 9 which will be described later. An escape portion may be provided on the swing arm 9 mounted on the housing 10 so that the portions of the housing 10 which are axially outward of the slits 10a will not contact with the swing arm 9.

As the ball bearings 1, 11, use may be made of a combination of balls of bearing steel and grease lubrication, but preferably, the material of the balls may be ceramics and oil may be used as a lubricant and further, a slight quantity of oil may preferably be poured into the raceway surfaces of the outer races 2, 12 and the inner races 3, 13 in advance. Alternatively, use may be made of the so-called oil plating which is a lubricating method of thinly applying a slight quantity of oil to the raceway surfaces of the outer races 2, 12 and the inner races 3, 13 in advance.

By using the ball bearings 1, 11 having their raceway surfaces subjected to the oil plating, the initial scattering of the lubricant from the ball bearings 1, 11 can be reduced and torque fluctuation can also be reduced as compared with the case of grease lubrication. Also, since the material of the balls is ceramics, there can be provided ball bearings 1, 11 which are low in wear and excellent in fretting durability.

It is preferable to design the ball bearings 1, 11 so as to be reduced in radial rigidity by choosing at least one of groups comprising making the radial gap greater than 15 μm exceeding the standard of 6 to 14 μm, or reducing the number of balls to six or less which is smaller than the standard of 7 to 8, and making the pre-load applied to the ball bearings 1, 11 less than 0.5 Kgf smaller than the standard of 0.5 to 1.0 Kgf. As the ball bearings 1, 11 used in the present invention, use can be made of standard ball bearings and therefore, the ball bearing device for a swing arm can be made inexpensively.

While the material of the retainer of the ball bearings 1, 11 may be stainless steel, iron, nylon or like material, it is more preferable to use a polymer member containing lubricating oil formed with synthetic resin containing lubricating oil. When a retainer comprising the polymer member containing lubricating oil is used, torque and torque fluctuation become small and further, the lubricating oil contained in the retainer oozes for a long time and therefore, good lubrication is effected for a long time and excellent durability is obtained.

Figure 7B:
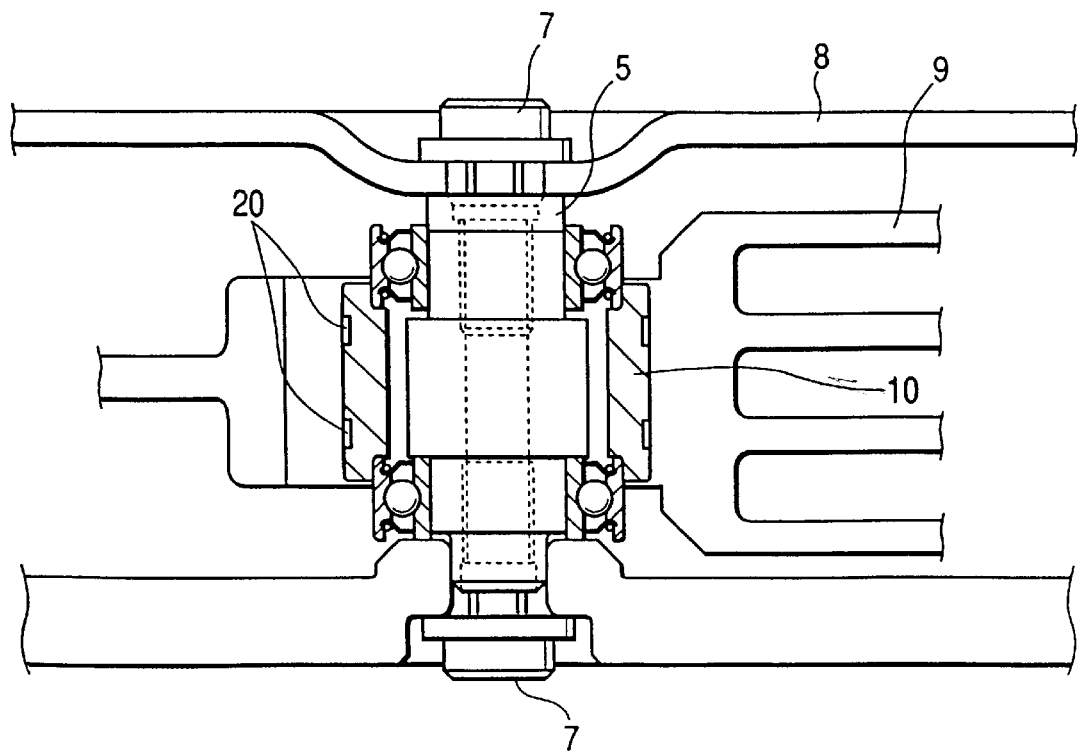
FIG. 7B is a schematic longitudinal cross-sectional view of the ball bearing device according to the seventh embodiment of the present invention when the device is used in an outer race turning type actuator having a voice coil motor.

FIG. 7B shows the seventh embodiment as it is actually incorporated into an apparatus. In this embodiment, the upper and lower end portions of the shaft 5 are fixed to a body case 8 by means of upper and lower bolts 7. When it is desired to further reduce the radial rigidity of the shaft 5, there may be adopted a cantilever structure in which only the lower portion of the shaft 5 is fixed to the body case 8 and the upper portion of the shaft 5 is not supported.

While the housing 10 is fitted and adhesively secured to the inner diametral surface of the swing arm 9, it may be fixed to the swing arm 9 by means of a bolt. When the housing 10 is to be adhesively secured, a circumferential groove-like adhesive reservoir 20 provided in the outer diametral surface of the housing 10 is filled with an adhesive agent.

Figure 9:
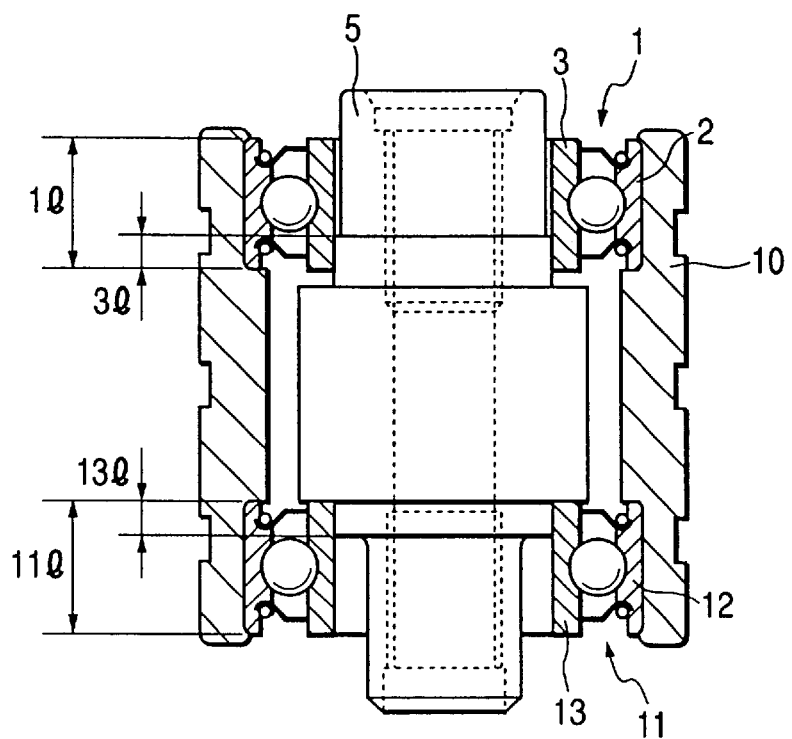
FIG. 9 is a schematic cross-sectional view of a ball bearing device according to a ninth embodiment of the present invention.

FIG. 9 shows a ninth embodiment of the present invention. In this embodiment, the axial lengths 3 l and 13 l of the portions of the inner diametral surfaces of the inner races 3 and 13 of the upper and lower ball bearings 1 and 11 which are fitted to the shaft 5 are ½ or less of the bearing widths 1 l and 11 l of the ball bearings 1 and 11. Unlike the seventh embodiment, the width of the housing 10 can be made the same as the width in the prior art and the housing 10 can secure the same mounting width as the mounting width for the swing arm 9 in the prior art.

Figure 10:
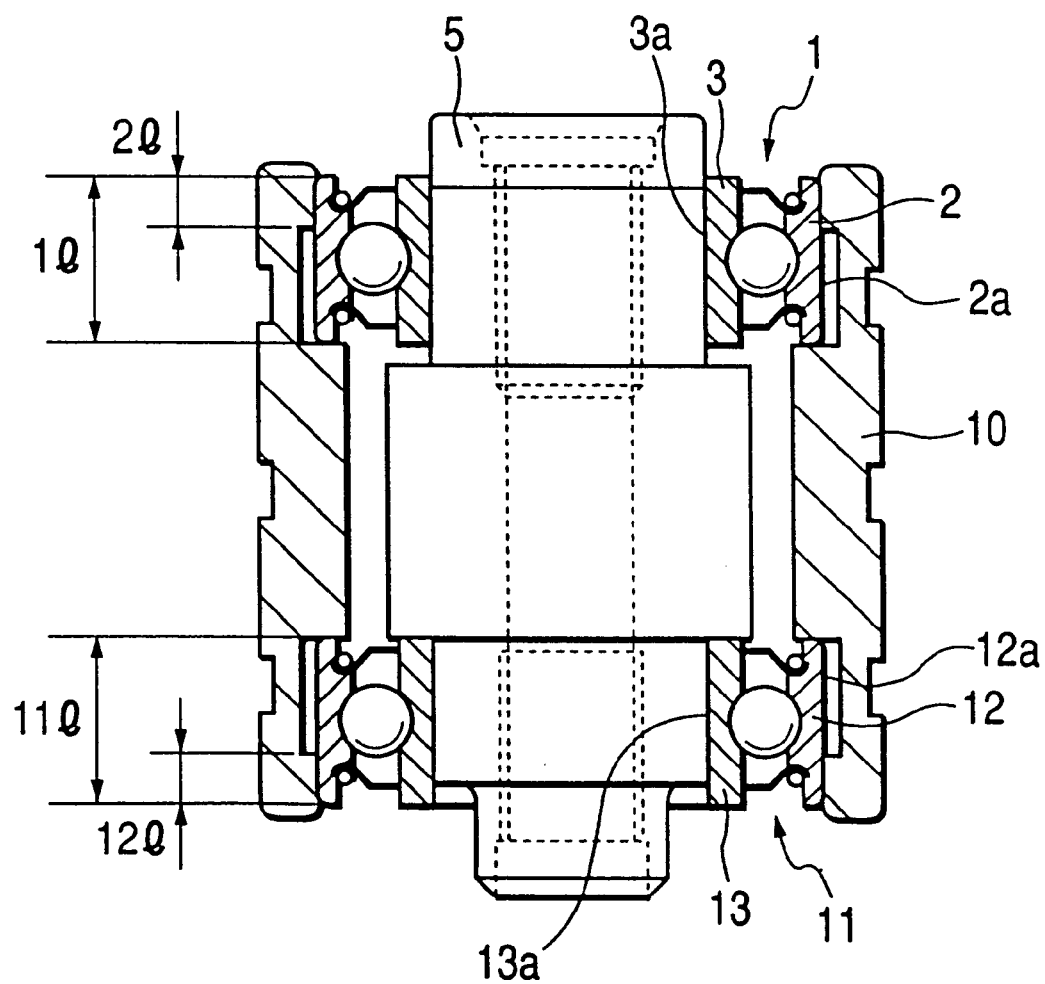
FIG. 10 is a schematic longitudinal cross-sectional view of a ball bearing device according to a tenth embodiment of the present invention.

FIG. 10 shows a tenth embodiment of the present invention. In this embodiment, the axial lengths 2 l and 12 l of the portions of the outer diametral surfaces of the outer races 2, 12 of the ball bearings 1, 11 which are fitted to the housing 10 are ½ or less of the bearing widths 1 l and 11 l of the ball bearings 1, 11. The difference of the present embodiment from the seventh embodiment is that the axially inside portions of the outer diametral surfaces 2a and 12a of the outer races are not in contact with the housing 10.

That is, in both of the two ball bearings 1 and 11, the portions of the outer diametral surfaces of the outer races 2 and 12 which are fitted to the housing 10 are axially outside portions. Therefore, the axial length of the housing 10 is enlarged and the moment rigidity thereof is improved.

Also, in the present embodiment, as in the ninth embodiment, the housing 10 can secure the same mounting width as the mounting with for the swing arm 9 in the prior art.

The ball bearings 1, 11 may be such that both of the axial length 3 l, 13 l of the portions of the inner diametral surfaces 3a, 13a of the inner races which are fitted to the shaft 5 and the axial lengths 2 l, 12 l of the portions of the outer diametral surfaces 2a, 12a of the outer races which are fitted to the housing 10 are ½ or less of the bearing widths 1 l, 11 l of the ball bearings.

Also, in the present invention, the radial rigidity of the ball bearing device may be reduced by the combination of the ball bearings 1, 11 and the housing 10, or radial rigidity of the ball bearing device may be reduced by the combination of the ball bearings 1, 11 and the shaft 5, or the radial rigidity of the ball bearing device may be reduced by the combination of the ball bearings 1, 11, the housing 10 and the shaft 5.

A third aspect of the present invention will now be described.

Figure 11A:
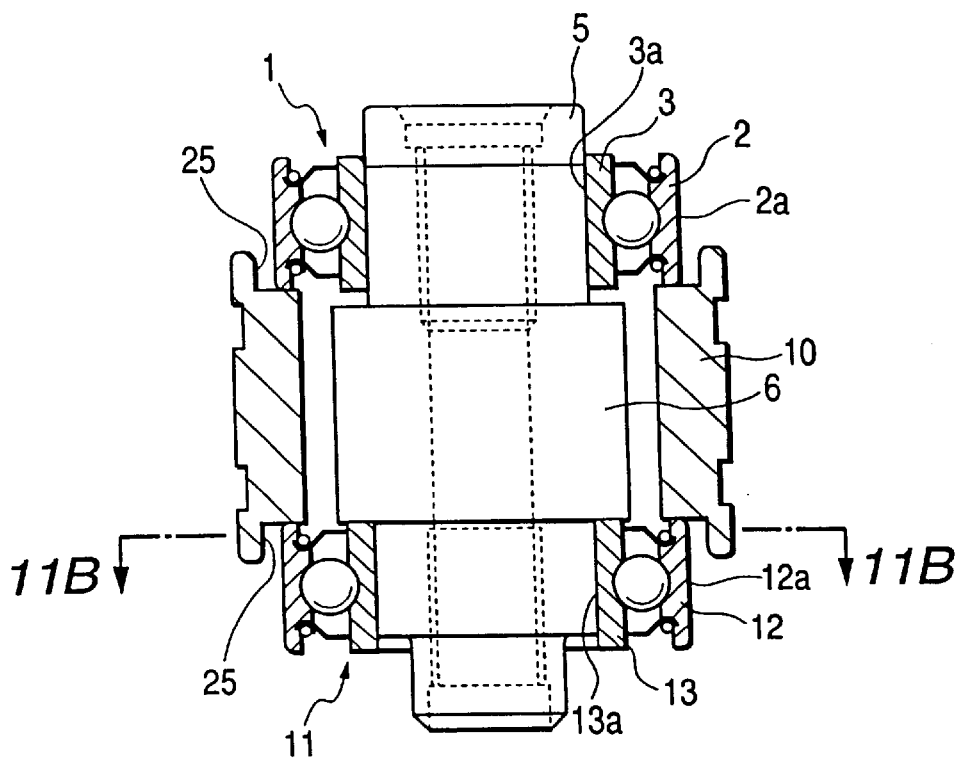
FIG. 11A is a schematic longitudinal cross-sectional view of a ball bearing device according to an eleventh embodiment of the present invention.
Figure 11B:
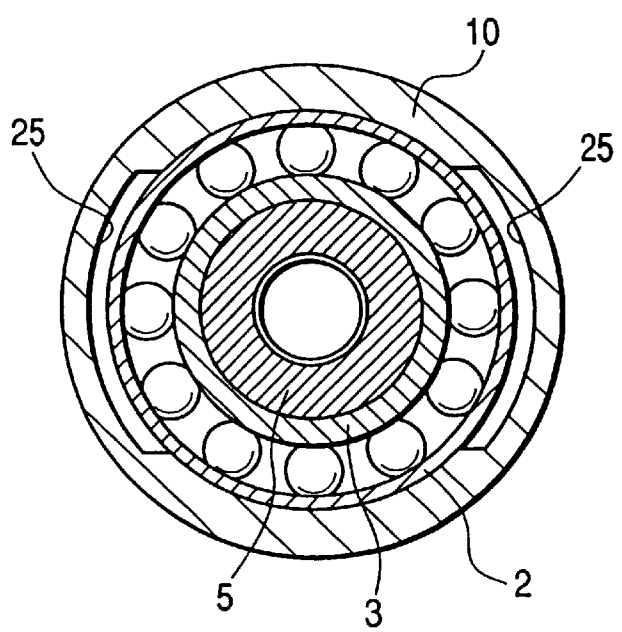
FIG. 11B is a cross-sectional view of the ball bearing device of FIG. 11A taken along the line 11B—11B of FIG. 11A.
Figure 12A:
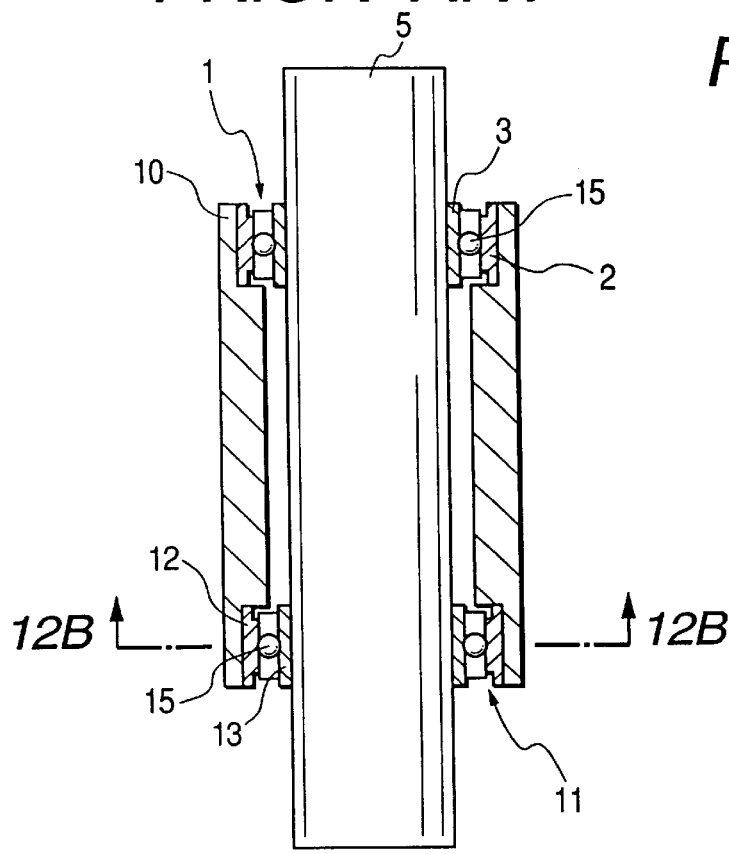
FIG. 12A is a cross-sectional view showing a ball bearing device according to the prior art.
Figure 12B:
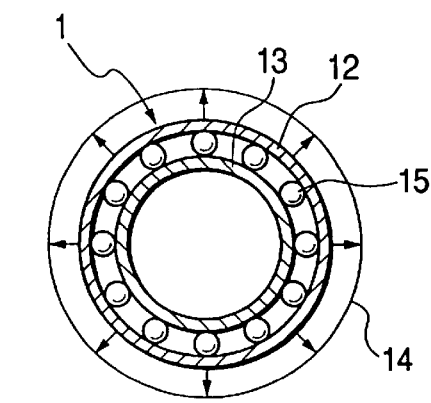
FIG. 12B shows the surface pressure distribution of the portion of contact between a raceway and balls in the prior art.
Figure 12C:
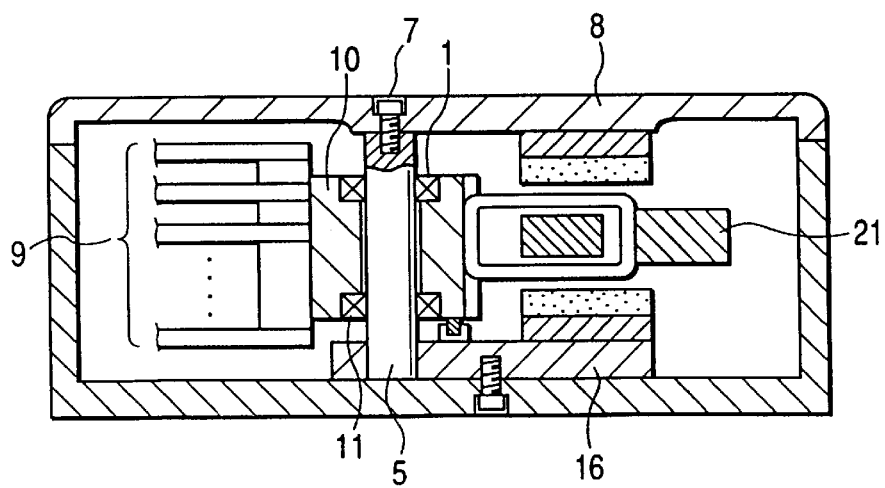
FIG. 12C is a schematic longitudinal cross-sectional view of the ball bearing device according to the prior art when the device is used in an outer race turning type actuator having a voice coil motor.

FIGS. 11A and 11B show an eleventh embodiment of a ball bearing device, which is constructed according to the third aspect of the present invention.

FIG. 11B is a cross-sectional view taken along the line 11B—11B of FIG. 11A, and in this embodiment, two ordinary ball bearings 1 and 11 are pressed into the housing 10 to thereby make the outer diametral surfaces and raceway surfaces of the outer races 2, 12 elliptical. On the inner diametral surface of the housing 10, escapes 25 are formed in advance on the opposite sides of the center axis of the ball bearings 1, 11 in one radial direction. If this is done, the ball bearings 1, 11 are loosely fitted in the portions of the escapes 25 and are tightly fitted in the pressed-in portion in the other radial direction orthogonal to the one radial direction, and a compression load acts on the outer races 2, 12 of the ball bearings in the pressed-in portion.

As a result, the outer diametral surfaces and raceway surfaces of the outer races 2, 12 have their cross-sections in a radial plane deformed into an elliptical shape in which the portions of the escapes 25 are on the major axis. If these escapes 25 are provided in a direction orthogonal to the axial direction of a swing arm 9 mounted on the housing 10, the radial bearing rigidity in a direction parallel to the axial direction of the swing arm can be made greater than in a direction orthogonal to the axial direction of the swing arm. The raceway surfaces of the inner races 3, 13 are circular in their cross-sections in a radial plane.

The above-described construction is similar to the construction of the fourth embodiment, and the other portions of the illustrated embodiment are constructed substantially similarly to the seventh embodiment.

The ball bearings 1, 11 and the ball bearing device in the present embodiment not only have their rigidity in the radial direction greatly reduced as compared with the rigidity in the radial direction in the prior art, but also the rigidities of the ball bearings 1, 11 in the radial direction are made to differ between two directions orthogonal to each other. As a result, the stability of the swing arm system can be enhanced and higher speed and higher accuracy of control are possible.

What is claimed is:

1. A ball bearing device for a swing arm, comprising:
    a plurality of ball bearings each including balls, an inner race, an outer race and a retainer;
    a shaft fitted to the inner diametral surface of said inner race of each said ball bearing; and
    a housing fitted to the outer diametral surface of said outer race of each said ball bearing,
    wherein, for each said ball bearing, at least one of (1) the axial length of the portion on the inner diametral surface of said inner race which is fitted to the shaft and (2) the axial length of the portion on the outer diametral surface of said outer race which is fitted to the housing is ½ or less of the bearing width of said ball bearing.

2. A ball bearing device according to claim 1, wherein said housing is formed with a plurality of recesses in an inner diametral surface thereof, the outer race of each said ball bearing being mounted to a corresponding one of said recesses.

3. A ball bearing device according to claim 1, wherein each said ball bearing is such that radial bearing rigidity in one radial direction is greater than radial bearing rigidity in a direction orthogonal to said one radial direction.

4. A ball bearing device according to claim 2, wherein each said recess includes diametrically opposed escapes having a clearance to the outer diametral surface of the outer race of the corresponding ball bearing to allow elliptical deformation of that outer race.

5. A ball bearing device according to claim 2, said housing is formed with recesses in its outer diametral surface near said ball bearings to reduce radial rigidity of said housing near said ball bearings.

6. A ball bearing device according to claim 5, wherein said recesses in said outer diametral surface of said housing are slits.

7. A ball bearing device for a swing arm, comprising:
    a ball bearing including balls, an inner race, an outer race and a retainer;
    a shaft fitted to the inner diametral surface of said inner race of said ball bearing; and
    a housing having an inner diametral surface and a recess formed in said inner diametral surface at an axial end thereof,
    wherein said outer race is mounted to said recess such that the axial length of the portion on the outer diametral surface of said outer race which is fitted to the inner diametral surface of said recess is ½ or less of the bearing width of said ball bearing.

8. A ball bearing device according to claim 7, said housing is formed with a recesses in its outer diametral surface near said ball bearing to reduce radial rigidity of said housing near said ball bearing.

9. A ball bearing device according to claim 8, wherein said recess in said outer diametral surface of said housing is a slit.

10. A ball bearing device according to claim 8, wherein said recess includes diametrically opposed escapes having a clearance to the outer diametral surface of said outer race to allow elliptical deformation of said outer race.

11. A method of stabilizing the high-speed control of a ball bearing device for a swing arm in which a plurality of ball bearings are mounted between a shaft and a housing, wherein, for each said ball bearing, at least one of (1) the axial length of the portion of the shaft which is fitted to the inner diametral surface of the inner race of the ball bearing and (2) the axial length of the portion of the housing which is fitted to the outer diametral surface of the outer race of the ball bearing is made ½ or less of the bearing width of the ball bearing, thereby reducing the radial bearing rigidity of the ball bearing device.

12. A method according to claim 11, wherein the outer race of each said ball bearing is mounted to a corresponding recess formed in the inner diametral surface of the housing.

13. A method according to claim 11, wherein the radial bearing rigidity of each ball bearing in one radial direction thereof is made greater than the radial bearing rigidity thereof in a direction orthogonal to said one radial direction.

* * * * *